United States Patent Office 3,424,285
Patented Jan. 28, 1969

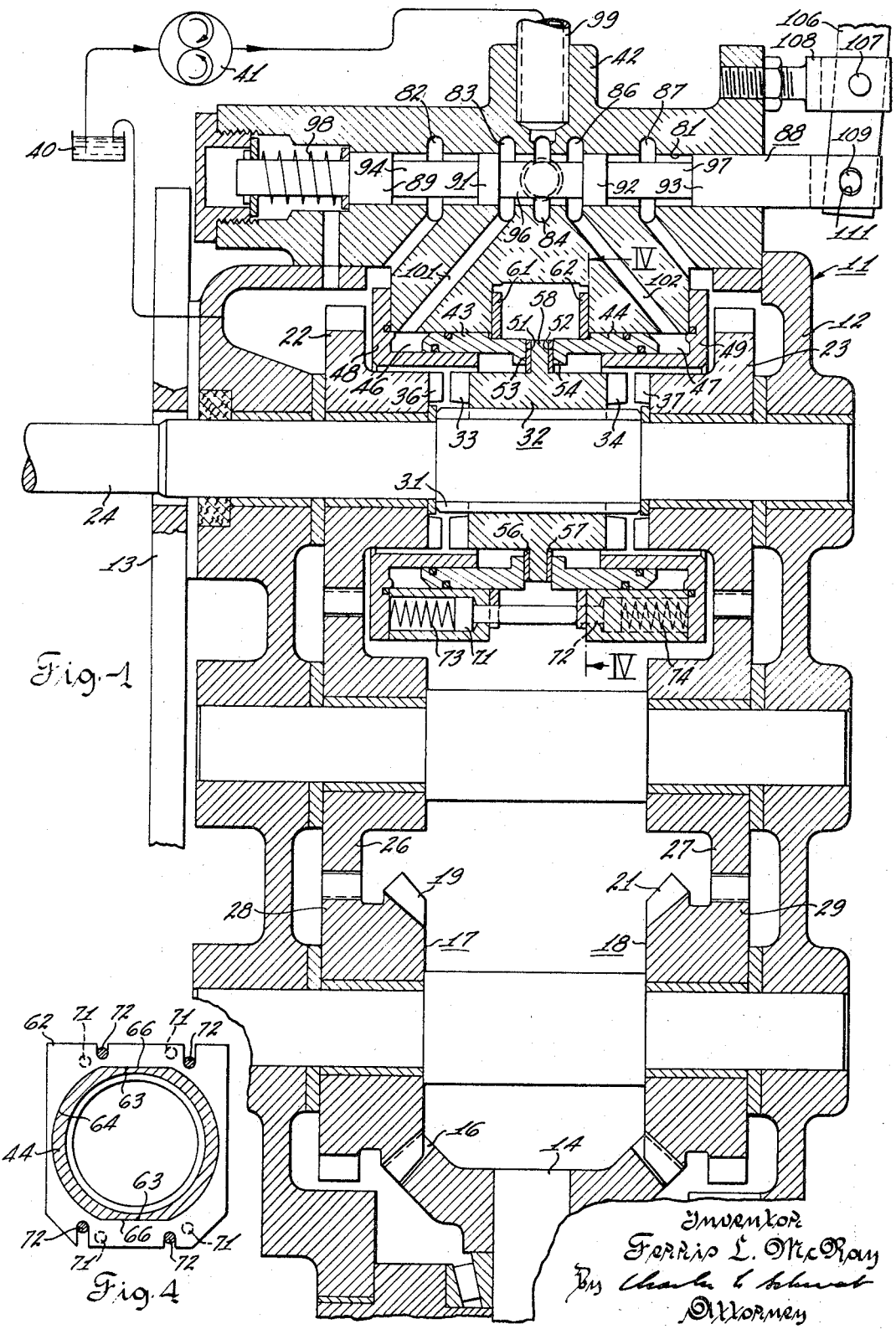

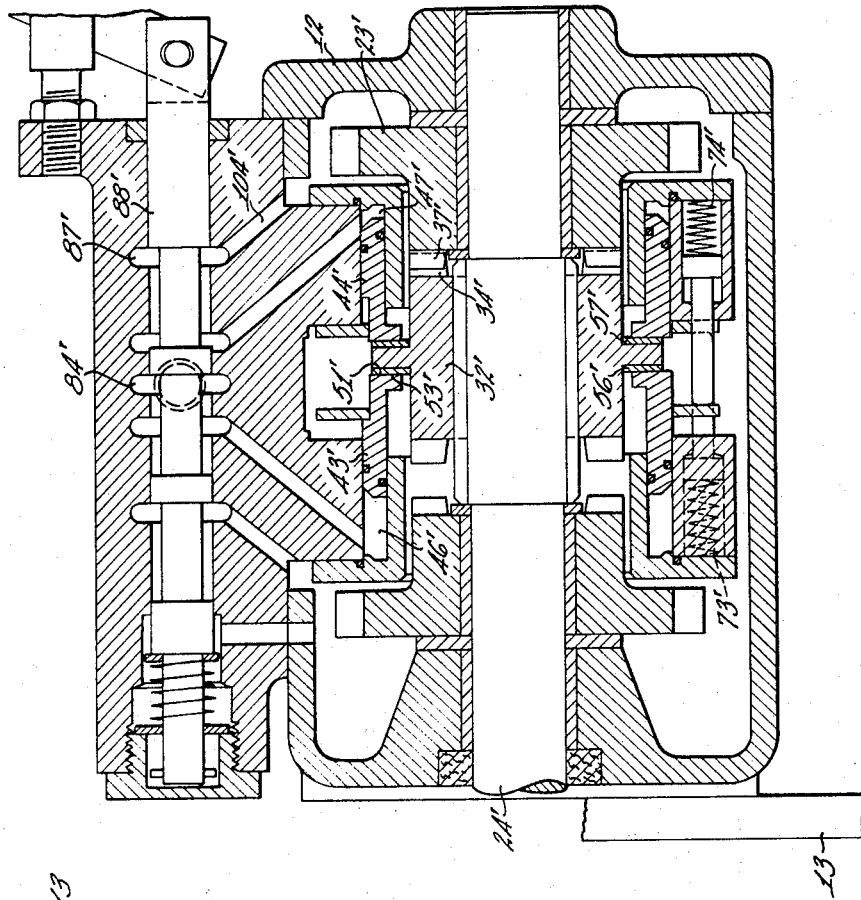

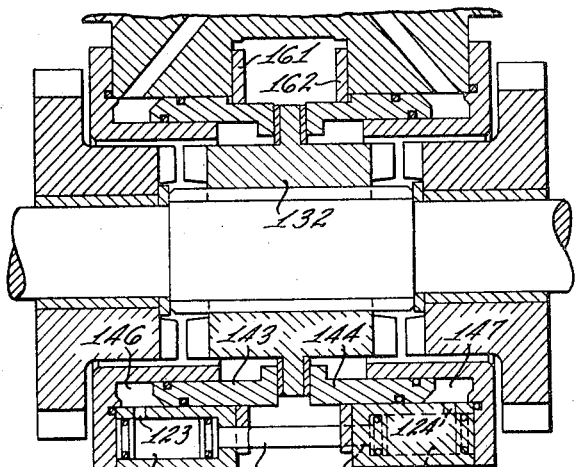
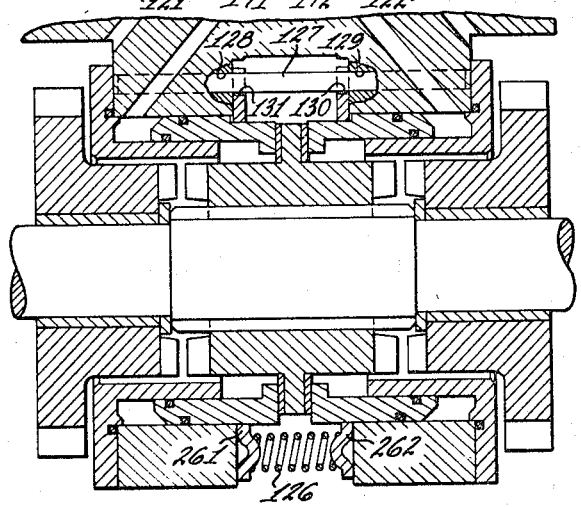
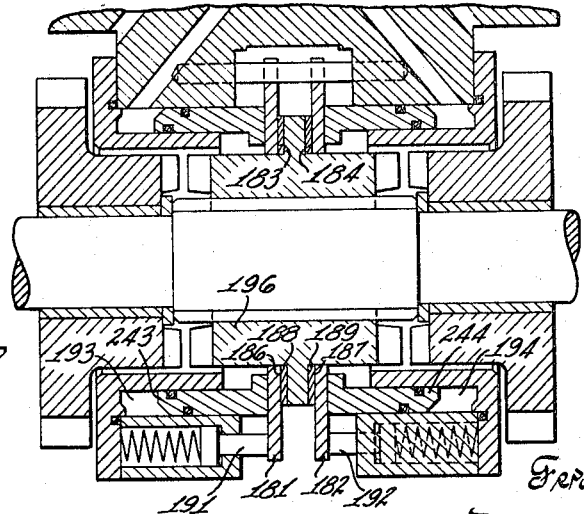

3,424,285
CONTROL MECHANISM FOR SHIFTING AND BRAKING A SHIFTABLE CLUTCHING MEMBER
Ferris L. McRay, Springfield, Ill., assignor to Allis-Chalmers Manufacturing Company, Milwaukee, Wis.
Filed Apr. 12, 1967, Ser. No. 630,405
U.S. Cl. 192—18                           11 Claims
Int. Cl. F16d 67/02, 25/00; B60t 11/10

ABSTRACT OF THE DISCLOSURE

The drawings and accompanying description disclose several embodiments of a clutch control which incorporates a friction brake for the driven shaft when the control is in neutral. The force for engaging the friction brake is provided by the same hydraulic actuators which effect shifting of the shiftable clutch member. The various illustrations relate to a motor grader control using a jaw clutch collar shiftable in opposite axial directions from a neutral nondriving position to drive establishing positions. The clutch collar is biased to remain in a neutral position either by springs or by pistons operated by the same pressure fluid effecting shifting and neutral braking.

---

This invention relates to a transmission control and more particularly to a control for a jaw clutch collar shiftable axially in opposite directions from a neutral position to positions for drivingly connecting a shaft to one of two gears on opposite sides of the shift collar. The control mechanism of this invention is further characterized by means for restraining the shift collar against rotation in the neutral position of the control. Heretofore various means have been suggested for operating a shift collar between its neutral and drive establishing positions, and various means have been proposed for braking and locking the driven shaft against rotation in the neutral position of the clutch control means. These prior devices have not proven entirely satisfactory in function, cost and service.

It is an object of this invention to provide a control for a jaw clutch collar wherein the shift collar is frictionally restrained against rotation by the clutch actuating means to effect a braking action on the driven shaft when the control is in a neutral position.

It is a further object of this invention to provide a hydraulically actuated control mechanism for a jaw clutch shift collar wherein the shift collar is frictionally held against rotation in the neutral position thereof by the hydraulic actuators employed to shift the control collar to drive establishing positions.

It is a further object of this invention to provide a hydraulically actuated control for a jaw clutch shift collar of the character hereinbefore outlined wherein the hydraulic actuators encircle the control shaft on which the shift collar is splined.

It is a further object of this invention to provide a hydraulic control for a jaw clutch shift collar wherein hydraulically actuated centering means are provided for the shift collar to maintain it in its neutral position.

These and other objects and advantages of this invention will be apparent when the following description is read in conjunction with the drawings in which:

FIG. 1 is a section view, on the line I—I in FIG. 2, through a control box of a motor grader in which the present invention is incorporated;

FIG. 2 is an end view of the control box shown in FIG. 1 with parts removed to more clearly show features of the present invention;

FIG. 3 is a section view taken on line III—III in FIG. 2;

FIG. 4 is a section view taken on the line IV—IV in FIG. 1;

FIG. 5 is a section view illustrating a second embodiment of my invention wherein hydraulically actuated centering means are provided;

FIG. 6 is a section view showing a third embodiment of my invention; and

FIG. 7 is a section view illustrating a fourth embodiment of my invention.

Referring to FIGS. 1, 2 and 4, the motor grader control box 11 includes a housing 12 secured to the motor grader frame 13 by suitable means, not shown. A power take-off shaft 14 delivers power from the vehicle engine, not shown, to the control box 11 through bevel gear 16 appropriately secured for rotation with shaft 14. Bevel gear 16 turns gears 17, 18 in opposite directions through its driving engagement with bevel gears 19, 21 on the gear clusters 17, 18. Gears 22, 23 rotatably mounted on driven shaft 24 are rotated in opposite directions through idler gears 26, 27 meshing with gears 28, 29 on the gear clusters 17, 18 and with gears 22, 23. Intermediate the gears 22, 23, the driven shaft 24 has a splined portion 31 on which an internally splined jaw clutch shift collar 32 is nonrotatably mounted for axial shifting movement. The collar 32 has jaw clutch teeth 33, 34 facing in axially opposite directions and adapted for driving engagement with complementary jaw clutch teeth 36, 37 formed on gears 22, 23. As shown in FIG. 1 the shift collar 32 is in a neutral position and in such condition the drive shaft 14 cannot transmit power to driven shaft 24.

A hydraulic control means for shifting and frictionally braking the shift collar 32 includes a source of pressure fluid, such as the schematically illustrated engine driven pump 41, for supplying fluid under pressure to the hydraulic control part 42 of the housing 12. An appropriate relief valve 45 is provided in part 42 which bypasses pressure fluid to reservoir 40 by way of passage 50 and a return passage between the housing 12 and the reservoir. Positioning of the shift collar 32 is achieved by a pair of hydraulic actuators built into part 42 of the housing 12 and having piston components 43, 44 acting in axially opposite directions when pressurized through pressure fluid being directed to the pressure chambers 46, 47 defined by cylinder portions 48, 49. The end of the piston components have annular thrust surfaces 51, 52 which are in axial thrust transmitting engagement with smooth annular faces 53, 54 formed on rings 56, 57, which are made of wear resistant nonmetallic material and are bonded to a radial flange 58 of collar 32. The rings 56, 57 may also be free floating, that is, not secured for rotation with either pistons 43, 44 or shift collar 32. The pistons or piston components 43, 44 are held against rotation relative to the housing 12 by locking follower plates 61, 62. As shown in FIG. 4, locking plate 62 has flat portions 63 in its bore 64 which cooperate with flat portion 66 formed on piston 44. The plates 61, 62 in turn are held against rotation relative to the housing 12 by centering piston pins 71, 72 whose free ends abut against plates, 62, 61, respectively. The centering pins 71, 72 are biased to their positions illustrated in FIG. 1 by compression coil springs 73, 74.

The operating means for controlling actuation of the pistons 43, 44 includes a control valve in the upper portion of housing part 42. The control valve includes a bore 81 and appropriate ports 82, 83, 84, 86, 87 and a valve spool 88 with appropriate lands 89, 91, 92, 93 and reduced diameter portions 94, 96 and 97. Conventional centering means 98 are provided on one end of the valve spool 88 to resiliently maintain it in its neutral position illustrated in FIG. 1, in which pressure fluid supplied by pump 41 to the input port 84 through conduit 99 is supplied to both pressure chambers 46, 47 through actuator ports 83, 86 and actuator supply passages 101, 102. Thus in the neutral position of the clutch control illustrated in FIG. 1, the hydraulic pressure will cause the hydraulic actuators to frictionally brake the collar 32 against rotation relative to the housing and thus the driven shaft 24 is frictionally held against rotation in view of its splined connection with collar 32.

The control valve spool 88 is operated by the motor grader operator through a manual control lever 106 pivotally connected by pin 107 to a bracket 108 in turn connected to housing portion 42. The lower end of lever 106 carries a pin 109 which cooperates with a pair of aligned slots 111 formed in the yoke at the exposed end of the spool 88.

A separate control station is provided in the control box for each of a plurality of controlled functions of the motor grader such as front wheel lean, lift-lower moldboard control, and the like. For instance in FIG. 2, a second station includes a driven shaft 24' and control valve spool 88', in upper housing part 42'. The inlet ports 84, 84' of the two illustrated stations in FIG. 2 are joined by a conduit 112 and another conduit 113 supplies pressure fluid in series to the next station, not shown.

Referring to FIG. 3 the second station of the control box for controlling transmission of power to driven shaft 24' is shown in a drive establishing position. The control valve spool 88' has been shifted to the left so that pressure fluid in chamber 47' is dumped to reservoir by way of reservoir port 87' and passage 104' interconnecting port 87' with the interior of housing 12 which is turn drains into the reservoir 40 as shown in FIG. 1. Pressure fluid supplied by pump 41 to input port 84' continues to be directed to pressure chamber 46' after the control valve has been shifted from its neutral position to the position shown in FIG. 3. As shown, the shift collar 32' has been shifted to the right so that its teeth 34' mesh with the teeth 37' of gear 23'. Thus the driven shaft 24' is rotated by power transmitted to gear 23' by its meshing engagement with gear 23. During transmission of power the flat annular surface 51' of piston 43' exerts thrust against relative rotating face 53' of collar 32'. This rotating sliding contact between face 53' and surface 51' would normally create a certain amount of wear and such wear is minimized by the use of wear resistant material for the plates 56', 57' and lubrication. The springs 73', 74' like springs 73, 74 are sufficiently weak to not inhibit operation of the jaw clutch collar 32' but do have sufficient strength to hold the collar 32' in its neutral position when the control valve spool 88' is returned to its neutral position. In the neutral position both pressure chambers 46' and 47' are subjected to the same pressure and since the effective pressure area of the pistons 43', 44' is the same the springs 73', 74' are not required to overcome any forces created by pressure fluid.

FIG. 5 shows a second embodiment of my invention which is similar to the embodiment illustrated in FIGS. 1 through 4, differing therefrom in that a plurality of hydraulic jacks center the shift collar 132. The piston pins 171, 172 of the jacks are pressure biased by fluid in actuating chambers or bores 121, 122 which are connected to pressure chambers 146, 147, respectively, through passages 123, 124. Thus in the neutral position of the clutch collar 132, as shown in FIG. 5, the pressure fluid acts against the pistons 143, 144 to frictionally brake the collar 132 and also acts on pins 171, 172 to properly center the shift collar 132 through their abutting engagement with plates 162, 161, respectively. An important advantage of the hydraulically pressurized centering pin arrangement illustrated in FIG. 5 is that the pressure fluid is not required to overcome the opposition of the springs otherwise provided for centering the collar 132 during actuation of the clutch. For instance when chamber 146 is pressurized and chamber 147 is connected to reservoir as will occur when the clutch collar is shifted to the right, chamber 122 will also be connected to the reservoir through its interconnecting passage 124 and thus there will be no opposition to movement of plate 161 by piston 143.

The embodiment of FIG. 6 differs from the other embodiments in that centering springs 126 are disposed between the follower locking plates 261, 262. Since the centering pins have been eliminated by placing the springs 126 between the plates 261, 262 a pin 127 is mounted in bores 128, 129 which passes through notches 131, 130 formed in plates 261, 262 to lock the latter against rotation relative to the housing.

FIG. 7 illustrates a fourth embodiment of the present invention wherein the centering plates 181, 182 have thrust surfaces 183, 184 in axial thrust transmitting engagement with faces 186, 187 on rings or disks 188, 189. This makes the actuating pistons 243, 244 in effect two part pistons. The centering means is also somewhat different in the version shown in FIG. 7 in that the pins 191, 192 act against the plates 181, 182, so as to add their thrust to the pressure fluid in chambers 193, 194 to assist the braking of the collar 196 in the neutral position of the jaw clutch.

While only a few embodiments of my invention have been illustrated and described it will be obvious to those familiar with the art that other embodiments of my invention can be employed without departing from the spirit of my invention.

The embodiments of the invention for which an exclusive property or privilege is claimed are defined as follows:

1. In a transmission having a housing,
 a rotatable driven shaft therein,
 two gears rotatable on said shaft,
 a shifting collar splined to said shaft between said gears and movable axially from a neutral position into driving engagement with either of said gears to drive said shaft, said gears and collar having interengaging clutch teeth thereon, and
 control means for selectively shifting said collar from its neutral position into driving engagement with either of said gears and for braking said collar in its neutral position including
  a pair of hydraulic actuators independently operable to shift said collar in axially opposite directions, respectively, from its neutral position into driving engagement with either of said gears, and
  a hydraulic control for said actuators including a valve having a neutral position in which both of said actuators are pressurized to exert axial thrust in axially opposite directions against said collar to frictionally restrain said collar against rotation relative to said housing and having clutch engaging positions in which said actuators are independently pressurized to effect shifting of said collar from its neutral position into driving engagement with either of said gears.

2. The structure set forth in claim 1 wherein each of said actuators have an axially shiftable component and said components have smooth axially facing thrust surfaces in axial thrust transmitting relation to said collar.

3. The structure set forth in claim 2 wherein said collar has a pair of faces complementary to said surfaces.

4. The structure set forth in claim 3 wherein said faces are formed on wear resistant nonmetallic material bonded to said collar.

5. The structure set forth in claim 1 wherein said actuator coaxially encircles said shaft.

6. The structure set forth in claim 5 and further comprising centering means for urging said collar toward its neutral position.

7. The structure set forth in claim 6 wherein centering means includes a pair of axially oppositely acting hydraulic jacks.

8. The structure set forth in claim 7 wherein said jacks are connected in free flow communication with said hydraulic actuators, respectively.

9. In a transmission having a housing,
a rotatable driven shaft therein,
two gears rotatable on said shaft,
a shifting collar splined to said shaft between said gears and movable from a neutral position into driving engagement with either of said gears to drive said shaft, said gears and collar having interengaging clutch teeth thereon,
a pair of annular faces on said collar extending radially of said shaft and facing in opposite axial directions relative thereto,
control means for selectively shifting said collar from its neutral position into driving engagement with either of said gears including
    a pair of cylinder portions on said housing,
    a pair of axially shiftable annular pistons mounted in said cylinder portions for axial reciprocation and having annular surfaces, respectively, in axial thrust transmitting engagement with said faces, respectively, said pistons being nonrotatable relative to said housing, and
    hydraulic control means for selectively moving said pistons axially to effect movement of said collar from its neutral position into driving engagement with either of said gears, and
    biasing means including said pistons urging said collar in axially opposite directions, when said collar is in its neutral position, effecting sufficient frictional engagement between said faces and surfaces to frictionally restrain said collar against rotation relative to said housing.

10. The structure set forth in claim 9 wherein said control means includes a control valve by which said cylinder portions are selectively pressurized with hydraulic fluid.

11. The structure set forth in claim 9 and further comprising means including a pair of hydraulic actuators for centering said collar in its neutral position when said control means are not actuated.

References Cited

UNITED STATES PATENTS

| 2,065,224 | 12/1936 | Hladik | 192—53 |
| 2,475,997 | 7/1949 | Smith | 192—18 X |
| 3,354,994 | 11/1967 | Sieving | 192—18.1 X |

FOREIGN PATENTS 525,124    8/1940    Great Britain.

BENJAMIN W. WYCHE III, *Primary Examiner.*

U.S. Cl. X.R.

74—411.5; 188—151; 192—85, 87.17